No. 631,514. Patented Aug. 22, 1899.
J. B. WELSCH.
THRESHING MACHINE.
(Application filed Mar. 19, 1898.)
(No Model.)

Witnesses:

Inventor
J. B. Welsch
By James J. Sheehy
Attorney

THE NORRIS PETERS CO., PHOTO-LITHO., WASHINGTON, D. C.

UNITED STATES PATENT OFFICE.

JOHN B. WELSCH, OF LINCOLN, NEBRASKA.

THRESHING-MACHINE.

SPECIFICATION forming part of Letters Patent No. 631,514, dated August 22, 1899.

Application filed March 19, 1898. Serial No. 674,504. (No model.)

*To all whom it may concern:*

Be it known that I, JOHN B. WELSCH, a citizen of the United States, residing at Lincoln, in the county of Lancaster and State of Nebraska, have invented new and useful Improvements in Threshing-Machines, of which the following is a specification.

My invention relates to threshing-machines, and more particularly to straw-racks—*i. e.*, racks which receive the straw as it comes from between the toothed cylinder and concave and have for their purpose to shake the grain out of the straw and then work said straw out of the machine.

The general object of my invention is to provide straw-racks which, while extremely simple and not liable to get out of order, are highly efficient in shaking the grain from the straw and afterward working the straw out of the machine, and are also so arranged and constructed as to afford considerable space above the grain-pan, and thereby prevent choking of the machine.

With the foregoing ends in view, the invention will be fully understood from the following description and claims when taken in conjunction with the annexed drawings, in which—

Figure 1:
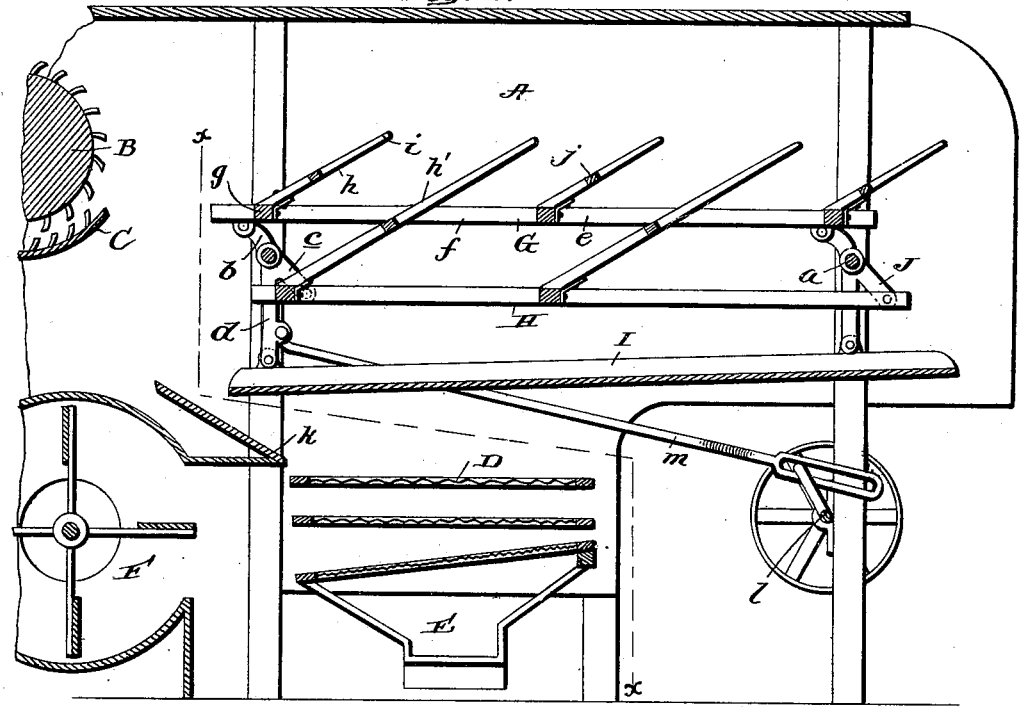
Figure 2:
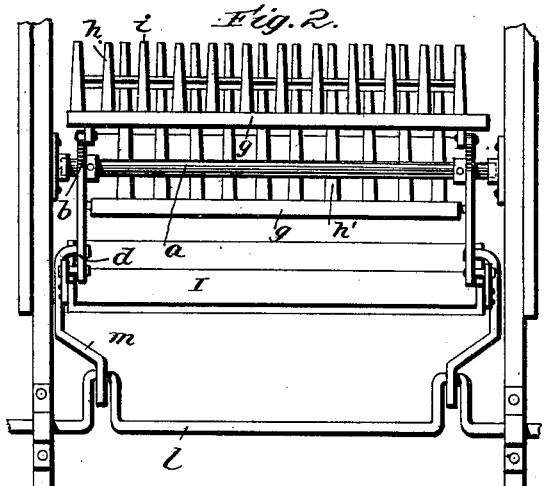
Figure 4:
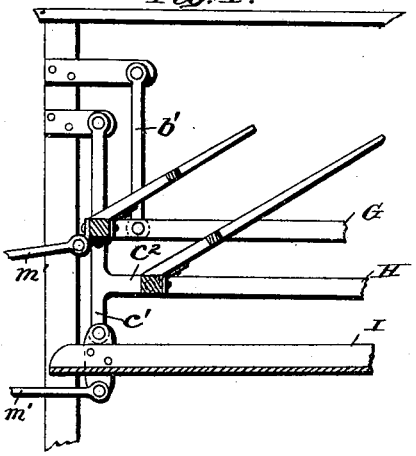
Figure 3:
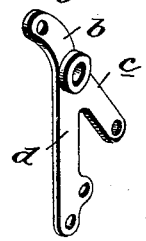

Figure 1 is a longitudinal central section of so much of a threshing-machine as is necessary to illustrate my invention. Fig. 2 is a transverse section of the same, taken in the plane indicated by the line $x\,x$ of Fig. 1. Fig. 3 is a perspective view of one of the rocker-irons; and Fig. 4 is a detail longitudinal section of a modification.

Referring by letter to the said drawings, and more particularly to Figs. 1, 2, and 3 thereof, A designates the casing, B C the toothed cylinder and concave, respectively, D the plurality of screens, E the discharge-trough, and F the blast-fan, of a threshing-machine, all of which may be of the ordinary or any other suitable construction.

G H designate my improved straw-racks, which are arranged one above the other.

I designates a grain-pan which is arranged below the rack H, and J designates the rocker-irons, of which four are employed, the same being fixed on transverse rock-shafts $a$ at points adjacent to the side walls of the casing A, as shown. Said rocker-arms J are of the construction shown—that is to say, they have upwardly and rearwardly extending arms $b$ for the connection of the upper rack G, downwardly and forwardly extending arms $c$ for the connection of the lower rack H, and depending arms $d$ for the connection of the grain-pan I.

The upper rack G comprises an approximately horizontal frame $e$, made up of side bars $f$ and connecting cross-bars $g$, and the plurality of transverse blades $h$, which extend upwardly and rearwardly from the cross-bars $g$ of the frame and are preferably made up of fingers $i$ and a cross-bar $j$, connecting the same. The lower rack H is similar in construction to the upper rack G with the exception that its blades $h$ are of a greater length than those of the rack G, so that the upper ends of the blades of both racks will rest in approximately the same horizontal plane, as shown in Fig. 1, and will thereby be enabled to assist in the forward movement of the straw. Having the blades $h$ of the lower rack H of an increased length is also advantageous because said blades are thereby enabled to prevent the straw from falling through the spaces between the blades of the upper rack and dropping with the grain on the grain-board.

In virtue of the rack G being connected to the arms $b$ of the rocker-irons J and the rack H being connected to the arms $c$ thereof, it will be seen that when the said irons are rocked in one direction the blades of rack G will be moved upwardly and rearwardly and the blades of rack H will be moved downwardly and forwardly, while when said irons are rocked in the opposite direction the blades of rack G will be moved downwardly and forwardly, while those of the rack H will be moved upwardly and rearwardly. Such movements of the racks G H will thoroughly open the straw and expeditiously shake the grain therefrom and at the same time will move the straw forwardly to the discharge end of the casing, and thereby prevent choking of the machine. It will also be appreciated that the racks G H are advantageous because of the simplicity and strength of their construction, which precludes the possibility of them getting out of order.

The grain-board I, which receives the grain as it falls from the racks, is pitched slightly downward toward the rear end of the machine, and in consequence when it is longitudinally reciprocated by the rocking of irons J the grain will be worked toward the forward end of the machine and will be discharged upon a chute $k$, and thereby conveyed to the uppermost sieve D of the series of sieves and will eventually find its way to the discharge-trough E in the ordinary manner.

The irons J may be connected by a pitman $m$ with and actuated by any suitable part of the threshing-machine.

In Fig. 4 of the drawings I have illustrated a modification of my invention, in which the racks G H and the pan I are similar to those shown in Figs. 1 and 2 and are relatively arranged in the same manner. The manner of hanging said racks and pans is, however, different from that shown in Figs. 1 and 2 in that the rack G is connected to one set of hangers $b'$, while the other rack H and the pan I are connected to another set of hangers $c'$. Said hangers $c'$ are provided at intermediate points of their lengths with arms $c^2$, and the rack H is connected with these arms, while the grain-pan is connected to the lower ends of the hangers, as shown.

Connecting the rack G to one set of hangers and the rack H and grain-pan I to another set of hangers entails the separate connection of the racks with the part or parts of the threshing-machine which actuates them, and I prefer to effect such connection through the medium of pitman $m'$, as shown.

Having thus described my invention, what I claim is—

1. In a threshing-machine, the combination of a casing, an upper straw-rack hung in the casing and comprising an open frame, and straight, transversely-disposed blades connected to and extending upwardly from the frame at intervals in the length thereof and inclined toward the rear or discharge end of the casing, a lower straw-rack also hung in the casing and comprising a frame, and straight, transversely-disposed blades connected to and extending upwardly from the frame at intervals in the length thereof and inclined toward the rear end of the casing; said blades of the lower rack being so arranged as to extend up through and above the frame of the upper rack at points intermediate of the blades of the upper rack and being of such length that their upper ends rest in approximately the same horizontal plane as the upper ends of the upper blades, and suitable means for moving the racks in opposite directions, substantially as and for the purpose set forth.

2. In a threshing-machine, the combination of a casing, an upper straw-rack hung in the casing and comprising an open frame having cross-bars at intervals in its length, and straight, transversely-disposed blades formed by fingers $i$ connected to and extending upwardly and rearwardly from the cross-bars of the frame at intervals in the length of said bars, and cross-bars $j$ connecting said fingers, a lower straw-rack also hung in the casing and comprising a frame having cross-bars at intervals in its length, and straight, transversely-disposed blades formed by fingers $i$ connected to and extending upwardly and rearwardly from the cross-bars of the frame at intervals in the length of said bars, and cross-bars $j$ connecting said fingers; said blades of the lower rack being so arranged as to extend up through and above the frame of the upper rack at points intermediate of the blades of the upper rack and being of such length that their upper ends rest in approximately the same horizontal plane as the upper ends of the upper blades, and suitable means for moving the racks in opposite directions, substantially as specified.

3. In a threshing-machine, the combination of a casing, the transverse rock-shafts journaled therein, the rocker-irons fixed on the rock-shafts adjacent to the side walls of the casing and respectively provided with arms $b$ $c$ and $d$, an upper straw-rack connected to the arms $b$ of the rocker-irons and comprising an open frame, and straight, transversely-disposed blades connected to and extending upwardly from the frame at intervals in the length thereof and inclined toward the discharge end of the casing, a lower straw-rack connected to the arms $c$ of the rocker-irons and comprising a frame, and straight, transversely-disposed blades connected to and extending upwardly from the frame at intervals in the length thereof and inclined toward the discharge end of the casing; said lower blades being so arranged as to extend up through and above the frame of the upper rack at points intermediate of the upper blades and being of such length that their upper ends rest in approximately the same horizontal plane as the ends of the upper blades, and a grain-pan connected to the arms $d$ of the rocker-irons and disposed below both racks, substantially as specified.

In testimony whereof I have hereunto set my hand in presence of two subscribing witnesses.

JOHN B. WELSCH.

Witnesses:
D. A. SCHABERG,
A. W. COHN.